United States Patent

Åsberg et al.

[11] Patent Number: 5,921,826
[45] Date of Patent: Jul. 13, 1999

[54] ANGLE GEARING, ESPECIALLY FOR A MARINE OUTBOARD DRIVE UNIT

[75] Inventors: Mikael Åsberg, Toralanda; Staffan Månsson, Hjälteby, both of Sweden

[73] Assignee: AB Volvo Penta, Gothenburg, Sweden

[21] Appl. No.: 08/849,191
[22] PCT Filed: Nov. 24, 1995
[86] PCT No.: PCT/SE95/01409
 § 371 Date: Jun. 23, 1997
 § 102(e) Date: Jun. 23, 1997
[87] PCT Pub. No.: WO96/16865
 PCT Pub. Date: Jun. 6, 1996

[30] Foreign Application Priority Data

Nov. 25, 1994 [SE] Sweden .................................. 9404093

[51] Int. Cl.⁶ .................................................. B63H 20/14
[52] U.S. Cl. ................................................ 440/75; 440/80
[58] Field of Search ................................ 440/75, 80, 81; 74/378, 423

[56] References Cited

U.S. PATENT DOCUMENTS

| 2,718,792 | 9/1955 | Kiekhaefer | 440/75 |
| 4,297,097 | 10/1981 | Kiekhaefer | 440/59 |
| 4,530,667 | 7/1985 | McCormick | 440/25 |
| 4,795,382 | 1/1989 | McCormick | 440/81 |

FOREIGN PATENT DOCUMENTS 409 610  8/1979  Sweden .

*Primary Examiner*—Sherman Basinger
*Attorney, Agent, or Firm*—Young & Thompson

[57] ABSTRACT

Angle gearing, especially a lower angle gearing between an intermediate shaft (2) and one or two propeller shafts (6, 7) in a marine outboard drive unit. A conical bevel gear (3) is pre-tensioned on the intermediate shaft against a cone (10) on the intermediate shaft by a nut (13) which is screwed onto a stud (21), which in turn is screwed into a central threaded bore (20) in the intermediate shaft end.

3 Claims, 2 Drawing Sheets

ANGLE GEARING, ESPECIALLY FOR A MARINE OUTBOARD DRIVE UNIT

BACKGROUND OF THE INVENTION

The present invention relates to an angle gearing, comprising a first shaft with a first bevel gear non-rotatably fixed on said first shaft and at least a second shaft with a second bevel gear non-rotatably fixed on said second shaft, said second bevel gear engaging the first bevel gear, at least the first shaft being provided with an attachment portion comprising a cylindrical splined distal portion and a conical proximal portion, the first conical gear having a bore with a corresponding splined portion and a conical portion.

Angle gearings of this type are used, for example in the lower transmission in marine outboard drive units. In the lower transmission in such a drive unit it is desirable to minimise the size of the gears, the primary reasons therefor being to keep the splash losses to a minimum and to keep the dimensions of the underwater housing to a minimum, this being advantageous for the drag resistance of the drive unit through the water. Also, it is normally less expensive to manufacture a small gear than a large gear. The technical development in the design and manufacture of gears has make it possible in marine outboard drive units for example, to use gears which are very small relative to the torque/power to be transmitted, especially in drive units with double counter-rotating propellers in which the gear load is distributed to two sides of the driving gear.

When high torque is to be transmitted from a small gear to its shaft, high demands are placed on the joint between the gear and the shaft and a mere splines connection is in many cases not sufficient. In a known angle gearing in a marine outboard drive unit, a connection of the type described by way of introduction is used, i.e. with a conical portion and a splined portion. The conical portion functions as a conical joint and therefore requires axial pretensioning. The transmittable torque is directly related to this pretensioning, which, if lost, will result in the splines having to transmit the entire torque, which they can do only temporarily. Furthermore, the driving function of the cone is lost and this will mean that the position of the driving gear relative to the driven gear will be incorrect.

In known angle gearings of the type described by way of introduction in marine outboard drive units, the shaft with the driving gear is made with a threaded end portion onto which a nut is screwed. The above described pretensioning is achieved by tightening the nut. This method of achieving the axial pretensioning can, however, cause problems due to the limited space available for the threaded end portion of the shaft with the driving gear. A short threaded portion will have a very short elastic elongation, which means that even a small movement or shrinkage up onto the cone will eliminate the entire pretension. Furthermore, narrow tolerances are placed on the angle between the conical portion of the shaft and its threaded portion.

SUMMARY OF THE INVENTION

The purpose of the present invention is in general to achieve an angle gearing of the type described by way of introduction which is constructed to eliminate the above-mentioned disadvantages.

This achieved according to the invention by virtue of the fact that at least the first shaft has a central threaded bore in the shaft end, that a threaded screw is screwed into the bore and that the first gear is pretensioned against the conical portion of the shaft by the screw.

The solution according to the invention makes it possible to essentially freely select the elastic elongation as needed. Furthermore, there is a certain tolerance for errors in the angle between the thread and the cone due to the fact that the screw is not completely fixed to the shaft. Finally, there is the possibility of selecting materials and heat treatment model without having to compromise for, on the one hand, the shaft and, on the other hand, the screw, in contrast to previous solutions where the shaft and the threaded end made together in one piece of the same material dictated costly compromises which were technically not the most suitable.

In a preferred embodiment of the angle gearing according to the invention, which has been developed particularly, but not exclusively for a marine outboard drive unit with double counter-rotating propeller shafts, the screw is a stud with a threaded portion extending outside the bore where the first gear is pretensioned against the conical portion of the shaft by a nut screwed onto the stud. This design permits the same assembly process for the driving gear on its shaft as in the previously known design with the threaded portion made in one piece with the shaft.

BRIEF DESCRIPTION OF THE DRAWINGS

The invention will be described in more detail with reference to examples shown in FIG. 1 shows a partially cut-away side view of a previously known marine outboard drive unit.

DESCRIPTION OF THE PREFERRED EMBODIMENT

Figure 1:
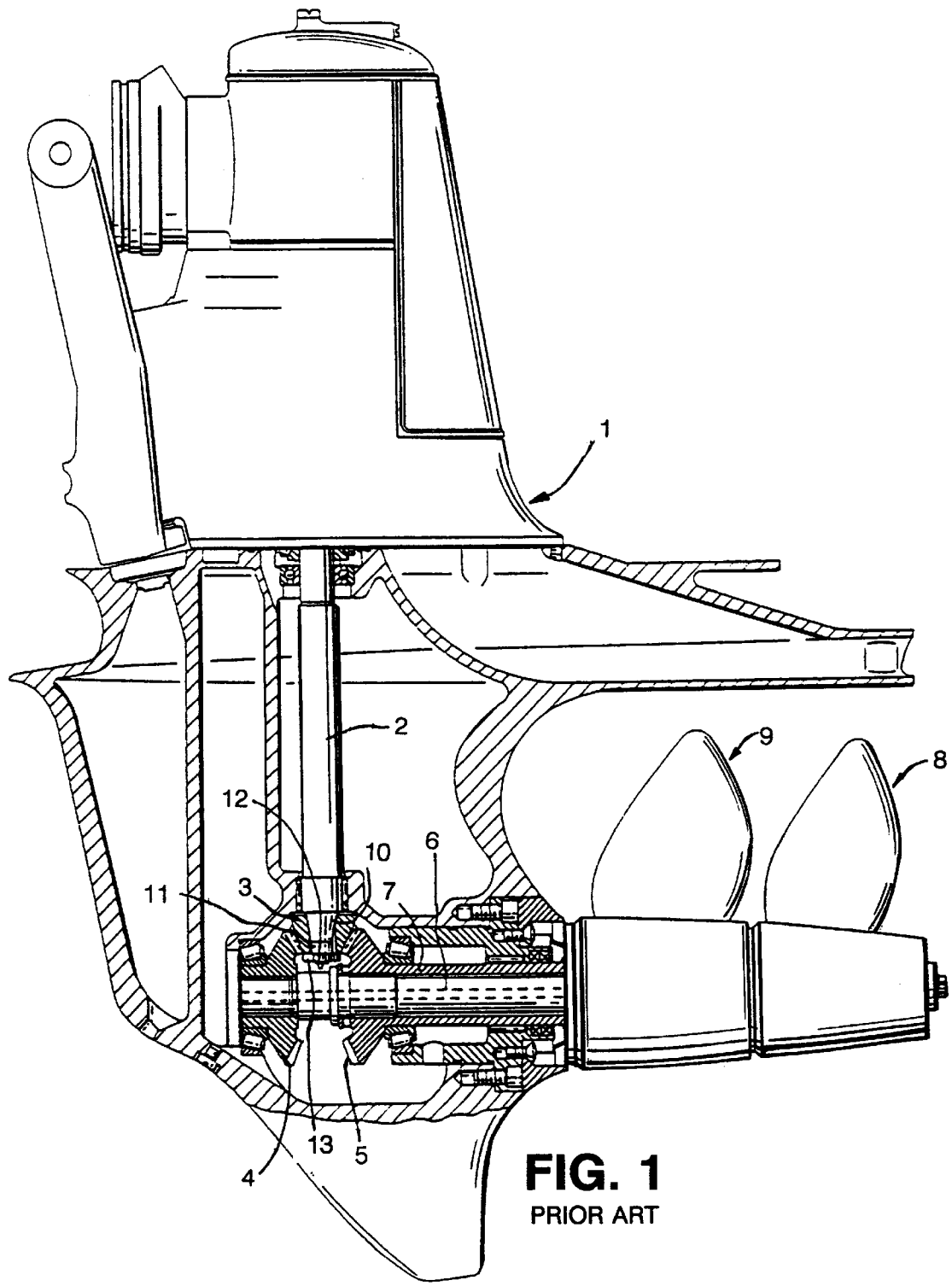

This drive unit generally designated 1 in FIG. 1 is an inboard-outboard drive unit which is intended to be mounted on the outside of the transom of a boat and to be drivably coupled to the output shaft of a motor (not shown). The drive unit contains a reversing gear mechanism, not shown in more detail here, from which the outgoing torque is transmitted to an intermediate shaft 2, on which a bevel gear 3 is non-rotatably fixed. The bevel gear 3 is in constant engagement with two gears 4 and 5, each of which is non-rotatably fixed to an individual propeller shaft 6 and 7, respectively, rotatably mounted in the transmission housing of the drive unit. The shaft 7 is a tubular shaft mounted concentrically on the shaft 6. Each of the shafts 6 and 7 supports a propeller 8 and 9, respectively. The arrangement described will drive the propeller shafts in opposite directions.

The intermediate shaft 2 has an end portion comprising a proximal conical portion 10, a splined intermediate portion 11 and a threaded distal portion 12. Here and in the following the terms "distal" and "proximal" refer to relative positioning along the drive train from the motor. The gear 3 has an bore which is complementary to the conical portion 10 and the intermediate splined portion 11 of the shaft 2. By means of a nut 13 screwed onto the threaded distal portion 12, the gear 3 is pretensioned against the conical portion 11.

Figure 2:
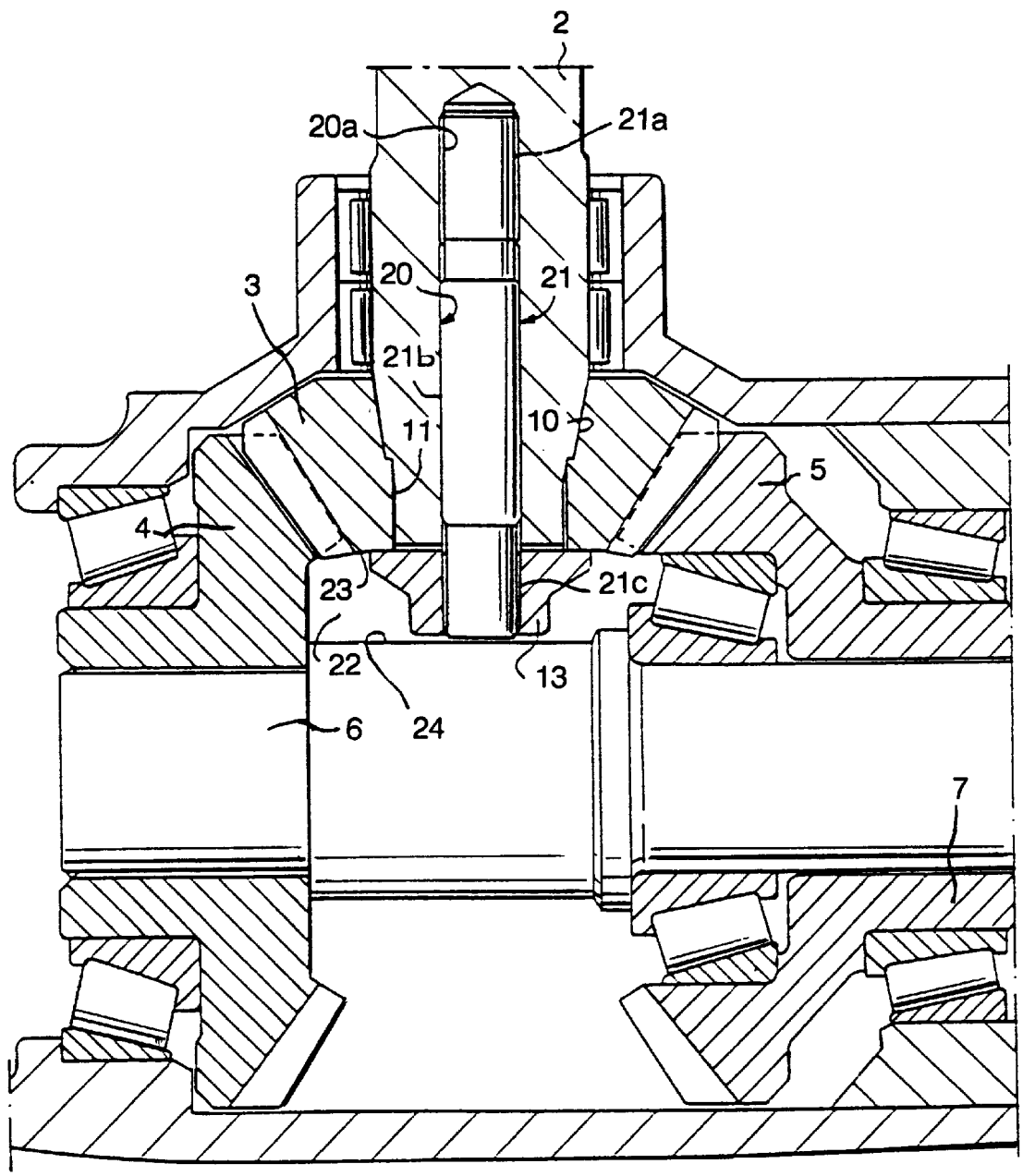
FIG. 2 is a longitudinal section through one embodiment of an angle gearing according to the invention.

FIG. 2 shows an angle gearing according to the invention, where the details having counterparts in FIG. 1 have been given the same reference numerals as in FIG. 1. The intermediate shaft 2 in FIG. 2 differs from that shown in FIG. 1 by virtue of the fact that the threaded distal portion 12 has been cut off. Instead, the shaft 2 has a central bore 20 which has an interior threaded end portion 20a. A stud 21 with a threaded proximal end 21a, a smooth intermediate portion 21*b* and a threaded distal end 21*c* has its threaded proximal end 21*a* screwed into the threaded end portion 20*a* of the bore. By means of a nut 13 screwed onto the threaded distal end 21*c* of the stud 21, the gear 3 is pretensioned against the conical portion 10 of the shaft 2.

Due to the fact that the center axis of the propeller shaft 6 crosses the center axis of the intermediate shaft 2, there is only very limited space 22 available for the nut 13 between the lower surface 23 of the bevel gear 3 and the opposite portion 24 of the shaft 6. The advantage of using a stud 20 is that the assembly can proceed in the same manner as the assembly of the known drive unit shown in FIG. 1, i.e. by first placing the nut 13 in the space 22, whereafter the shaft 2 with the stud 20 screwed into it is inserted through the bore in the bevel gear 3 until the threaded distal end of the stud 20 comes into engagement with the nut 13. The nut is then rotated to pull the shaft 2 down into place and pretension the bevel gear 3.

We claim:

1. Angle gearing, comprising:

a first shaft, a first bevel gear non-rotatably fixed on said first shaft, and at least a second shaft with a second bevel gear non-rotatably fixed on said second shaft, said second bevel gear engaging the first bevel gear;

at least the first shaft being provided with a central threaded bore in the distal end thereof and an attachment portion comprising a cylindrical splined distal portion and a conical portion, the first bevel gear having a hole with a corresponding splined portion and a conical portion; and a threaded stud screwed into the bore, the first bevel gear being pretensioned against the conical portion of the first shaft by a nut screwed onto the stud.

2. Angle gearing according to claim 1, wherein the first shaft is arranged and constructed to be driveably connected to a motor of a marine outboard drive unit and the second shaft is joined to a propeller shaft.

3. Angle gearing according to claim 2, further comprising second and third gears, respectively on a second and a third shaft, which are concentrically mounted and form a pair of counter-rotating propeller shafts, and wherein the first bevel gear engages the second and third gears.

* * * * *